United States Patent
Franca et al.

(10) Patent No.: US 12,312,535 B2
(45) Date of Patent: May 27, 2025

(54) FUNCTIONALIZED NANOPARTICLES AND POLYMERS FOR FOAMER APPLICATIONS IN UPSTREAM ENVIRONMENTS

(71) Applicant: Baker Hughes Oilfield Operations LLC, Houston, TX (US)

(72) Inventors: Leonardo Franca, Katy, TX (US); Tomasa Ledesma, Houston, TX (US); Rostyslav Dolog, Houston, TX (US); Radhika Suresh, Sugar Land, TX (US); Daniel Fakunle, Houston, TX (US)

(73) Assignee: Baker Hughes Oilfield Operations LLC, Houston, TX (US)

(*) Notice: Subject to any disclaimer, the term of this patent is extended or adjusted under 35 U.S.C. 154(b) by 0 days.

(21) Appl. No.: 18/227,214

(22) Filed: Jul. 27, 2023

(65) Prior Publication Data
US 2025/0034449 A1    Jan. 30, 2025

(51) Int. Cl.
C09K 8/594 (2006.01)
C09K 8/584 (2006.01)
C09K 8/588 (2006.01)
E21B 43/16 (2006.01)

(52) U.S. Cl.
CPC .............. *C09K 8/594* (2013.01); *C09K 8/584* (2013.01); *C09K 8/588* (2013.01); *E21B 43/16* (2013.01); *C09K 2208/10* (2013.01)

(58) Field of Classification Search
CPC .................................................... C09K 8/594
See application file for complete search history.

(56) References Cited

U.S. PATENT DOCUMENTS 5,566,760 A * 10/1996 Harris ................... E21B 43/267
507/216
2003/0220204 A1    11/2003 Baran et al.
2015/0175876 A1    6/2015 Resasco et al.
2019/0374916 A1 * 12/2019 Sherman ................... C08J 5/043
2020/0165403 A1    5/2020 Kabbabe Malave et al.
2022/0412197 A1    12/2022 Alyousef et al.
2023/0002669 A1 *  1/2023 Hiraoka ................. C09K 8/594

OTHER PUBLICATIONS

Fu, Chunkai, et al., "The effect of foam quality, particle concentration and flow rate on nanoparticle-stabilized CO2 mobility control foams", Royal Society of Chemistry; RSC Adv., Feb. 2019, 9313-9322.
Xue-Chen, Tang, et al., "Nanoparticle-reinforced foam system for enhanced oil recovery (EOR): Mechanistic review and perspective", Petroleum Science, https://doi.org/10.1016/j.petsci.2022.12.007, Dec. 2022, 23 pp.
International Search Report and Written Opinion for PCT/US2024/040064 mailed Nov. 20, 2024.

* cited by examiner

*Primary Examiner* — William D Hutton, Jr.
*Assistant Examiner* — Avi T Skaist
(74) *Attorney, Agent, or Firm* — Baker Hughes Company

(57) ABSTRACT

Functionalized foaming agents can be used to produce and improve stabilized foamers for use in the recovery of petroleum products from subterranean formations. In some embodiments, the functionalized foaming agent includes at least one nanoparticle, at least one polymer, or a combination thereof, where the nanoparticle(s), the polymer(s), or the combination thereof includes a functional group from a donor molecule. Suitable donor molecules include organosilicon molecules, alkyl halides with a chain of eight or more carbon atoms, and combinations of the same. In other embodiments, the functionalized foaming agent includes at least one nanoparticle, at least one polymer, or a combination thereof and a carrier fluid. The functionalized foaming agent can be introduced into a well or reservoir as part of an enhanced oil recovery (EOR) by injecting slugs of the functionalized foaming agent and slugs of gas in an alternating pattern to produce a foam.

11 Claims, 1 Drawing Sheet

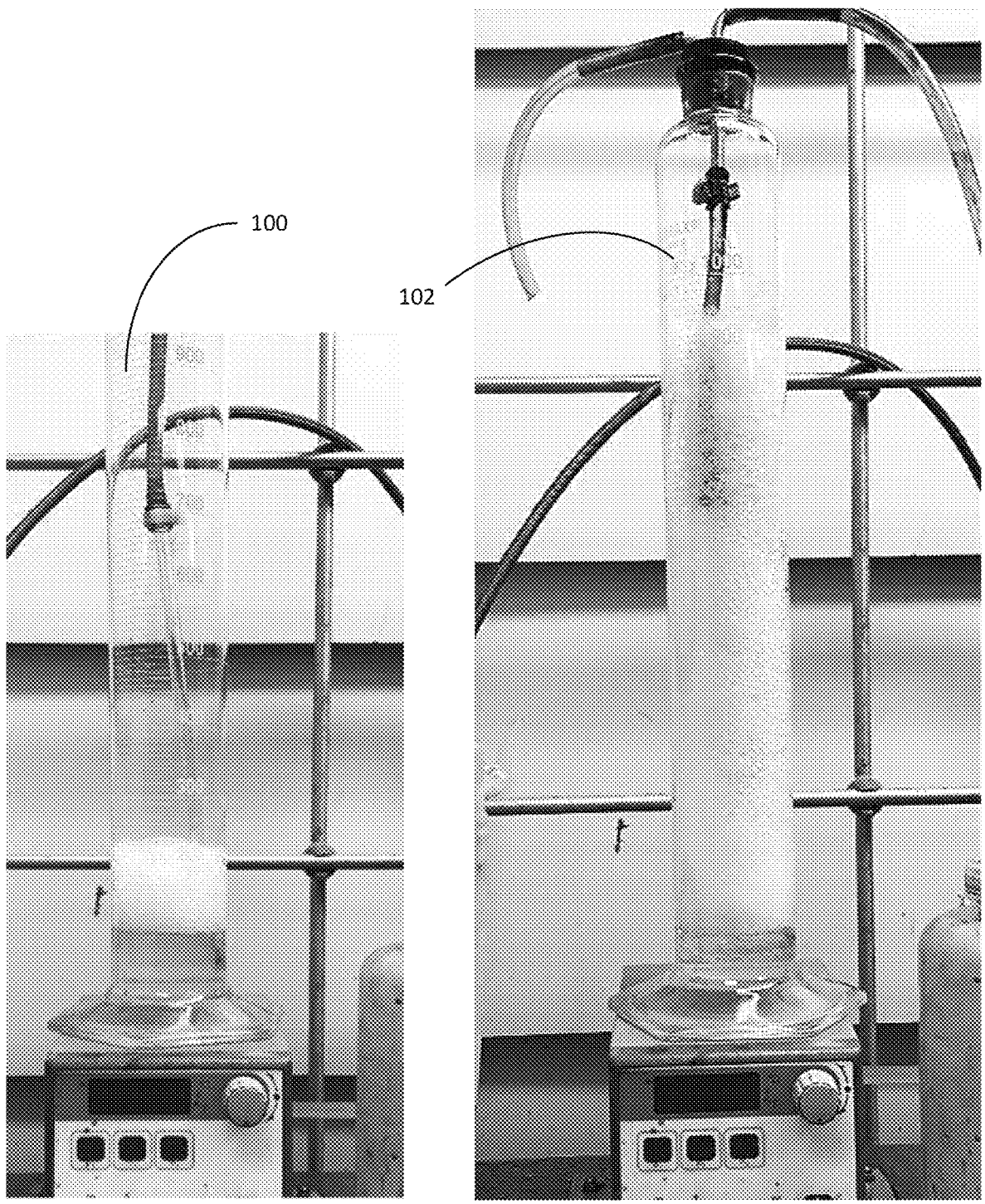

FUNCTIONALIZED NANOPARTICLES AND POLYMERS FOR FOAMER APPLICATIONS IN UPSTREAM ENVIRONMENTS

FIELD OF THE INVENTION

This invention generally relates to enhanced oil recovery for hydrocarbon production and, more particularly, but not by way of limitation, to a formulation and method for generating and stabilizing foam for foam-assisted hydrocarbon production.

BACKGROUND OF THE INVENTION

Technologies that facilitate hydrocarbon production are of increasing interest to the oil and gas industry. Enhanced oil recovery (EOR) techniques such as $CO_2$ injection, polymer flooding, and surfactant injection are often employed in oil reservoirs to retrieve residual oil after production has started to decline. Foam-assisted EOR techniques are frequently used for this purpose. Foam has surprisingly low mobility through oil wells, and this mobility tends to control the motion of other reservoir fluids, including the oil to be displaced. By alternatively injecting slugs of a surfactant solution and gas within an oil reservoir, foam can be produced in situ and used to displace oil from wells. Foam may also be produced by combining equipment shear and gas with naturally occurring surfactant(s) and water in a well.

During a foam-based oil recovery process, a narrow front of finely textured and very low-mobility foam is generated, which separates downstream liquid from upstream injected gas, typically in the form of coarsely textured, relatively mobile foam. Under single directional flow, the finely textured, low-mobility foam front grows gradually and destabilizes over time, often due to an expanding gas-liquid interface or to an emulsion formed by the crude oil at the gas-liquid interface. This growth causes the foam front to slow down, thereby reducing the effectiveness of the foam-displacement EOR.

In addition to the problems of foam destabilization and reduced mobility, traditional foaming chemistries are often high-cost and require the introduction of large volumes of polymers/surfactants with a high molecular weight. These polymers and surfactants tend to be overdosed, which may create undesirable side effects. Further, traditional foaming chemistries often present interface issues in downstream equipment, such as separators and gas towers, thereby impacting the efficiency of downstream processing.

A need exists, therefore, for improved foaming chemistries that can generate stabilized foam for use in EOR and other applications.

SUMMARY OF THE INVENTION

In one aspect, a functionalized foaming agent is disclosed for use in foam generation and stabilization, where the functionalized foaming agent includes at least one nanoparticle, at least one polymer, or a combination thereof; and the at least one nanoparticle, the at least one polymer, or the combination thereof further includes a functional group from a donor molecule. Suitable donor molecules include organosilicon molecules, alkyl halides with a chain of eight or more carbon atoms, and combinations of the same.

In another aspect, a functionalized foaming agent may include a carrier fluid and at least one nanoparticle, at least one polymer, or a combination thereof. The at least one nanoparticle, the at least one polymer, or the combination thereof includes a functional group from a donor molecule, where the donor molecule may be organosilicon molecules, alkyl halides with a chain of eight or more carbon atoms, and combinations of the same.

In another aspect, a method for producing a foam for hydrocarbon production is disclosed. The method may include the steps of obtaining a functionalized foaming agent with at least one nanoparticle, at least one polymer, or a combination thereof, and injecting slugs of the functionalized foaming agent and slugs of a gas alternatively within an oil reservoir to produce the foam. The at least one nanoparticle, the at least one polymer, of the combination thereof includes a functional group from a donor molecule, and the donor molecule may be organosilicon molecules, alkyl halides with a chain of eight or more carbon atoms, and combinations of the same.

BRIEF DESCRIPTION OF THE DRAWINGS

The above and other objects and advantages of this invention may be more clearly seen when viewed in conjunction with the accompanying drawing wherein:

FIG. 1 depicts foam columns from tests observing the foam generating capacity of an exemplary embodiment of the functionalized foaming agent, where the foaming agent includes a nanoparticle.

DETAILED DESCRIPTION

Functionalized foaming agents are herein described, where the functionalized foaming agents are low-cost, provide greater efficiency and are more thermostable than existing foaming chemistries. The functionalized foaming agents formulated in accordance with exemplary embodiments reduce residence time, are characterized by low toxicity, and do not present the same interface issues as existing foaming chemistries. Using the functionalized foaming agents formulated in accordance with exemplary embodiments, good water quality is still observed after both foam collapse and oil separation. The functionalized foaming agents may therefore enter both industrial water and oil systems without compromising the efficiency of oil, gas, and water treatments.

In exemplary embodiments, the functionalized foaming agent includes at least one nanoparticle, at least one polymer, or a combination thereof.

Several functionalized nanoparticles with a scale of less than 100 nm have been identified as useful for inclusion in the functionalized foaming agent. Suitable nanoparticles include, but are not necessarily limited to, silica nanoparticles, alumina nanoparticles, titania nanoparticles, aluminosilicate nanoparticles, magnesium oxide nanoparticles, zinc oxide nanoparticles, and combinations of the same. These nanoparticles exhibit both the ability to produce foam and to reverse emulsion formation at the gas-liquid interface.

In embodiments where the functionalized foaming agent includes the at least one polymer, suitable polymers include polymers that have an amino group. Non-limiting exemplary polymers include polyvinylpyrrolidone, polyethyleneimine, and polyvinylimidazole.

The selected nanoparticle(s) and/or polymer(s) include a functional group obtained from a donor molecule. Suitable donor molecules include organosilicon molecules, alkyl halides with a chain of eight or more carbon atoms, and combinations of the same. Examples of suitable alkyl halides include iodododecane, 3-glycidoxypropyltrimethoxysilane ("glymo"), and bromohexane.

In several embodiments, the donor molecule is an organosilicon molecule where the at least one nanoparticle is a silica nanoparticle, alumina nanoparticle, titania nanoparticle, magnesium oxide nanoparticle, zinc oxide nanoparticle, or a combination of the same. In non-limiting exemplary embodiment, the at least one nanoparticle is an organosilicon-functionalized silica nanoparticle or an organosilicon-functionalized zinc oxide nanoparticle.

In another exemplary embodiment, the donor molecule is an alkyl halide with a chain of eight or more carbon atoms, and the at least one nanoparticle is an aluminosilicate nanoparticle. In another embodiment, the at least one nanoparticle is a glymo-functionalized aluminosilicate nanoparticle. In other embodiments, the at least one polymer is polyvinylpyrrolidone functionalized with iodododecane or polyvinylpyrrolidone functionalized with bromohexane.

The functionalized foaming agent may also include a carrier fluid. In some non-limiting exemplary embodiments, the carrier fluid is water, brine, or another aqueous solution. In other embodiments, the carrier fluid is an organic solvent, such as an aromatic and non-aromatic solvent, a crude oil, or a synthetic oil.

The concentration of the at least one nanoparticle, the at least one polymer, or the combination thereof in the carrier fluid may be between about 1 ppm to about 10,000 ppm. In certain embodiments, the concentration is between about 50 ppm to about 5,000 ppm. In a non-limiting exemplary embodiment, the concentration of the at least one nanoparticle, the at least one polymer, or the combination thereof is about 1,000 ppm in the carrier fluid. In another non-limiting embodiment, the concentration is about 600 ppm in the carrier fluid.

In certain embodiments, a secondary foamer is also included in the functionalized foaming agent. The combination of the nanoparticle(s) and/or polymer(s) with the secondary foamer permits effective foam production with a much lower dosage of the secondary foamer than would be necessary for treatments with the secondary foamer without the nanoparticle(s) and/or polymer(s). Suitable secondary foamers include high molecular weight polymers, high molecular weight surfactants, and combinations of the same. Examples of suitable secondary foamers include modified silicone compound alkyl siloxane ester, polydimethylsiloxane, polyoxyalkylene sulfate, alcohol ether sulfate ammonium salt, coco amidopropyl betaine, lauryl hydroxysultaine, nonyl phenol, coco amidopropyl hydroxysultaine. It will be appreciated that these and other secondary foamers may be combined to give a synergistic overall performance. In some embodiments, the secondary foamer further includes a foamer stabilizer, such as 2-butoxyethanol or N-butyl alcohol.

In certain embodiments, the functionalized foaming agent includes a rheology control agent, such as a viscosifier, to obtain desirable flow properties. The functionalized foaming agent also includes a solvent in some embodiments.

A method for producing a foam for hydrocarbon production may be accomplished by obtaining a functionalized foaming agent and then injecting slugs of the functionalized foaming and slugs of a gas into the well or a hydrocarbon/oil producing reservoir in an alternating pattern to produce the foam. Suitable gases include nitrogen, carbon dioxide, and natural gas. These and other gases may also be used in combination.

In certain embodiments, the step of obtaining the functionalized foaming agent includes selecting a base nanoparticle and then functionalizing the base nanoparticle. Suitable base nanoparticles include silica nanoparticles, alumina nanoparticles, titania nanoparticles, aluminosilicate nanoparticles, magnesium oxide nanoparticles, zinc oxide nanoparticles, and combinations thereof. The step of functionalizing the base nanoparticle may include dispersing the base nanoparticle in a solvent with a donor molecule and reacting the base nanoparticle with the donor molecule. In embodiments in which the donor molecule is an organosilicon molecule, the base nanoparticle and the donor molecule may be reacted at a temperature within the range from about 26° C. to about 100° C. In some embodiments, the reaction temperature may be about 50° C. to 80° C. Where the donor molecule is an alkyl halide, the base polymer and the donor molecule may be reacted at a temperature within the range from about 26° C. to about 100° C. In some embodiments, the reaction temperature may be about 50° C. to 80° C.

In other embodiments, the step of obtaining the functionalized foaming agent includes selecting a base polymer and then functionalizing the base polymer. Suitable polymers include those having an amino group, including but not limited to polyvinylpyrrolidone, polyethylene-imine, and polyvinylimidazole. The base polymer may be functionalized through dispersing the base polymer in a solvent with the donor molecule, and reacting the base polymer with the donor molecule.

In some embodiments, the step of injecting slugs of the functionalized foaming agent and slugs of a gas includes the step of injecting the at least one nanoparticle, the at least one polymer, or the combination thereof into a crude oil in a concentration of about 1 ppm to about 10,000 ppm. The method may further a step of mixing the at least one nanoparticle or the at least one polymer with a secondary foamer. In such cases, the concentration of secondary foamer in the crude oil may be between about 50 ppm to about 5,000 ppm when injected. In some embodiments, the stabilizing foamer includes about 600 ppm nanoparticle(s) and/or polymer(s) and about 100 ppm secondary foaming agent in the crude oil.

In some embodiments, the method further includes a mixing step, where the functionalized foaming agent is mixed with a carrier fluid before the step of alternating the injection slugs of the functionalized foaming agent and slugs of the gas within the well or the hydrocarbon/oil producing reservoir.

Example I

Several tests were performed to determine the foam generating capacity of a group of candidate nanoparticles and polymers. For these tests, prescription bottles were each filled with 80 mL of crude oil, followed by 20 mL of produced water (synthetic brine). All bottles were submitted for a bottle shaker for five minutes. 600 ppm of 1% solution of each nanoparticle and polymer was added to a respective bottle, and the bottles were then agitated by hand approximately 100 times. After agitation, the bottles were each submitted to visual inspection over fifteen minutes to examine the following features: water separation (water dropped), speed of water separation, interface oil/water quality, water quality separated, oil dehydration, unresolved emulsion, foam establishment, and solids precipitation. The best foam-generating nanoparticles and polymers were identified to be those functionalized with donor molecules classified as organosilicon molecules, alkyl halides with a chain of eight or more carbon atoms, or both.

Example II

Foam column tests were performed to further simulate the foaming capacity of nanoparticles in the presence of gas, oil, and water. For a certain round of tests, a glymo-functionalized aluminosilicate nanoparticle was introduced in combination with secondary foamer FMO6000, an existing Baker Petrolite product. The glymo-functionalized aluminosilicate nanoparticle was diluted at 1 weight (wt.) % in water, and the FMO6000 was diluted at 20 wt. % in U14 solvent. As illustrated in FIG. 1, the results demonstrated that the combination of FMO6000 with the glymo-functionalized aluminosilicate nanoparticle (102) substantially increased the amount of foam generated, compared with the same amount of FMO6000 used on its own (100).

| Product | Rate | Peak Foam Height (mL) |
|---|---|---|
| Blank | N/A | 220 |
| FMO6000 (FIG. 1, Column 100) | 100 ppm | 400 |
| FMO6000 | 1,000 ppm | 1,000 |
| glymo-functionalized aluminosilicate nanoparticle + FMO6000 (FIG. 1, Column 102) | 600 ppm glymo functionalized alumino silicate nanoparticle (1%) + 100 ppm FMO6000 (20%) | 1,000 |

In the foregoing specification, the invention has been described with reference to specific embodiments thereof. However, it will be evident that various modifications and changes can be made thereto without departing from the broader scope of the invention as set forth in the appended claims. Accordingly, the specification is to be regarded in an illustrative rather than a restrictive sense. For example, different nanoparticles, polymers, donor molecules, secondary foamers, treatment procedures, proportions, dosages, and amounts not specifically identified or described in this disclosure or not evaluated in a particular Example are still expected to be within the scope of this invention.

The present invention may suitably comprise, consist of, or consist essentially of the elements disclosed and may be practiced in the absence of an element not disclosed. As used herein, the singular forms "a," "an," and "the" are intended to include the plural forms as well, unless the context clearly indicates otherwise. As used herein, the term "about" in reference to a given parameter is inclusive of the stated value and has the meaning dictated by the context (e.g., it includes the degree of error associated with measurement of the given parameter). As used herein, the term "and/or" includes any and all combinations of one or more of the associated listed items.

It is claimed:

1. A functionalized foaming agent for use in foam generation and stabilization comprising at least one nanoparticle, at least one polymer, or a combination thereof, wherein the at least one nanoparticle, the at least one polymer, or the combination thereof further comprises a functional donor molecule, wherein the donor molecule is an alkyl halide selected from the group consisting of iodododecane and bromohexane.

2. The functionalized foaming agent of claim 1, wherein the at least one nanoparticle is selected from the group consisting of silica nanoparticles, alumina nanoparticles, titania nanoparticles, magnesium oxide nanoparticles, zinc oxide nanoparticles, and combinations thereof, and wherein the donor molecule is an organosilicon molecule.

3. The functionalized foaming agent of claim 1, wherein the at least one nanoparticle is an aluminosilicate nanoparticle.

4. The functionalized foaming agent of claim 1, wherein the at least one polymer comprises an amino group.

5. The functionalized foaming agent of claim 4, wherein the at least one polymer is polyvinylpyrrolidone, polyethylene-imine, or polyvinylimidazole.

6. A functionalized foaming agent for hydrocarbon production comprising:
at least one nanoparticle, at least one polymer, or a combination thereof, wherein the at least one nanoparticle, the at least one polymer, or the combination thereof further comprises a functional donor molecule, wherein the donor molecule is an alkyl halide selected from the group consisting of iodododecane and bromohexane; and
a carrier fluid.

7. The functionalized foaming agent of claim 6, wherein the at least one nanoparticle is selected from the group consisting of silica nanoparticles, alumina nanoparticles, titania nanoparticles, aluminosilicate nanoparticles, magnesium oxide nanoparticles, zinc oxide nanoparticles, and combinations thereof.

8. The functionalized foaming agent of claim 6, wherein the at least one nanoparticle, the at least one polymer, or the combination thereof is present in the carrier fluid at a concentration between about 1 ppm to about 10,000 ppm.

9. The functionalized foaming agent of claim 8, wherein the concentration of the at least one nanoparticle, the at least one polymer, or the combination thereof in the carrier fluid is between about 50 ppm to about 5,000 ppm.

10. The functionalized foaming agent of claim 9, wherein the concentration of the at least one nanoparticle, the at least one polymer, or the combination thereof in the carrier fluid is about 600 ppm.

11. The functionalized foaming agent of claim 6 further comprising a secondary foamer selected from the group consisting of polymers, surfactants, and combinations thereof.

* * * * *